(12) United States Patent
Akahori

(10) Patent No.: US 8,019,009 B2
(45) Date of Patent: Sep. 13, 2011

(54) EQUALIZER CIRCUIT

(75) Inventor: Hiroji Akahori, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 520 days.

(21) Appl. No.: 12/238,746

(22) Filed: Sep. 26, 2008

(65) Prior Publication Data

US 2009/0129457 A1 May 21, 2009

(30) Foreign Application Priority Data

Oct. 5, 2007 (JP) ................................. 2007-262150

(51) Int. Cl.
*H04L 27/01* (2006.01)
(52) U.S. Cl. ........ 375/260; 375/316; 375/345; 375/346; 375/350; 375/348
(58) Field of Classification Search .................. 375/260, 375/316, 345, 346, 350, 348
See application file for complete search history.

(56) References Cited

U.S. PATENT DOCUMENTS

2006/0209974 A1   9/2006   Yoshida

*Primary Examiner* — Chieh M Fan
*Assistant Examiner* — Siu Lee
(74) *Attorney, Agent, or Firm* — Volentine & Whitt, PLLC

(57) ABSTRACT

In an equalizer circuit of one aspect, a first Fourier transform circuit Fourier-transforms an input signal and outputs a corresponding first Fourier-transformed signal, and a first extracting circuit extracts a plurality of pilot symbols from the first Fourier-transformed signal. An inverse Fourier transform circuit calculates a complex gain of each path of the input signal by inverse-transforming the plurality of pilot symbols extracted by the first extracting circuit. A detecting circuit detects at least one of a power value and a mean amplitude of the input signal, and a coefficient determining circuit determines a coefficient corresponding to the at least one of the power value and the mean amplitude detected by the detecting circuit. A second extracting circuit extracts complex gains having a power larger than a threshold obtained by multiplying the coefficient determined by the coefficient determining circuit by a value obtained by integrating the power for a period of time, wherein the power is obtained from the complex gains of each path of the input signal calculated by the inverse Fourier transform circuit. A second Fourier transform circuit Fourier-transforms the extracted complex gains from the second extracting circuit to obtain a corresponding second Fourier-transformed signal, and an equalizing calculation circuit equalizes the input signal using the second Fourier-transformed signal.

12 Claims, 10 Drawing Sheets

EQUALIZER CIRCUIT

BACKGROUND OF THE INVENTION

1. Field of the Invention

The present invention generally relates to the demodulation of OFDM (Orthogonal Frequency Division Multiplexing) digital modulated signals, and more particularly, the present invention relates to an equalizer which may be utilized in the demodulation of OFDM digital modulated signals.

A claim of priority is made to Japanese patent application no. 2007-262150, filed Oct. 5, 2007, the entirety of which is incorporated herein by reference.

2. Description of Related Art

In broadcasting systems, such as terrestrial digital broadcasting (ISDB-T), OFDM modulation techniques have been adopted in view of their relative immunity to multi-path interference. In OFDM modulation, a scattered pilot method may be utilized in which modulation is executed by scattering pilot symbols along frequency and time directions as amplitude and phase references in the data symbols, and demodulation is executed by estimating propagation-path characteristics (channel estimation) using the pilot symbols and compensating the amplitude and phase of the received signal according to the estimated propagation-path characteristics (that is, removing distortion of the propagation-path)

Propagation-path estimation using channel and symbol filters is generally known in the art. This technology extracts information for compensation of the sub-carrier of pilot symbols using already-known pilot symbol and generates the information for compensation of sub-carriers not including the pilot symbols by filtering. Consequently, noise components included in the sub-carrier of pilot symbols pass through the filter, and spread to neighboring channels, and then an error in propagation-path estimation occurs. A method for carrying out more precise propagation-path-characteristics estimation not only by using pilot symbols included in a current OFDM symbol but also by holding a pilot symbols in past OFDM symbols so as to reduce intervals between sub-carries including pilot symbols can be used in order to reduce the above error in propagation-path-characteristics estimation. However, since there is a difference between the propagation-path characteristics received by the past OFDM symbols and the propagation-path characteristics received by the current OFDM symbol in the circumstances where the propagation-path state is changed rapidly, the above error in propagation-path estimation can become rather large.

In addition, there is an already-known propagation path estimator for estimating directly a complex gain and a delay time in a propagation path. The estimator calculates a complex gain and delay time having the smallest difference between a product of complex gain and delay time in a propagation path estimated by a received pilot symbol signal obtained by using the already-known pilot symbol and a product of complex gain and delay time in a propagation path estimated by the already-known pilot symbol, and the estimator transforms the above complex gain and delay time to frequency components and multiplies the frequency components by the original multiplicative inverse. Since the delay time calculated by the above method is not a real delay time and is calculated based on discrete time used in digital signal processing, there is an error in the delay time, and a plurality of complex gains occurs at a plurality of delay times as errors. Therefore, in an estimation of a real propagation-path caused by plurality of delay paths, complex gains occurs at more delay time positions than the number of the delay paths occurs in reality. Subsequently, the error in propagation-path estimation becomes larger. Additionally, the conventional method calculates complex gains and delay times in the number of detectable delay paths. First, the largest complex gain and delay time is obtained among the detectable complex gains and delay times, and generates a product of the already-known pilot symbol signals and the above obtained complex gain and delay time to subtract the received pilot signals by the above generated product. Secondly, the procedure is moved to detection of the second strongest delay path and the same calculation is being carried out. Consequently, repeating times more than the number of delay paths necessary to be detected becomes necessary, and then calculation amount becomes very large. Furthermore, since the number of delay paths in a real transmission cannot be already known, largish repeating time is necessary to be used.

In addition, according to the paragraph 0057 of the Japanese Patent Application Laid-Open Publication No. 2006-262039, a propagation-path estimation apparatus is publicly known, as follows. The propagation-path estimation apparatus conducts inverse Fourier transform using only the received pilot symbols, generates a value as a threshold by subtracting the predetermined power from the largest power represented by the calculated complex gains, and uses only a complex gain having a power larger than the threshold as information for the propagation-path estimation.

However, according to the propagation-path estimation apparatus described in Japanese Patent Application Laid-Open Publication No. 2006-262039, there is a problem as follows, too. In the case where a fading phenomena caused by a multi-path in a propagation path between a base station and a mobile station, a variation in amplitudes of required receiving radio wave arises as time passes, and both states of larger and smaller ratios of the noise component to the required radio wave are mixed in the time domain. In an example shown in FIG. 13, during a period T1, the noise ratio to the required radio wave becomes smaller, and during another period T2, the noise ratio to the required radio wave becomes larger. However, in the case where a fading phoneme of FIG. 13 occurs after a value has been determined as a threshold by subtracting the predetermined power from the largest power, as in the before-mentioned technology according to Japanese Patent Application Laid-Open Publication No. 2006-262039, it becomes more possible that most of the noise components passes during another period T2, even if the required radio wave can be received while restraining most of the noise components from passing during a period T1. Consequently, the precision of the estimation becomes lower and the received signal cannot be demodulated stably.

SUMMARY OF THE INVENTION

According to an aspect of the present invention, an equalizer circuit includes first and second Fourier transform circuits, first and second extracting circuits, an inverse Fourier transform circuit, a detecting circuit, a coefficient determining circuit, and an equalization calculating circuit. The first Fourier transform circuit Fourier-transforms an input signal and outputs a corresponding first Fourier-transformed signal, and the first extracting circuit extracts a plurality of pilot symbols from the first Fourier-transformed signal. The inverse Fourier transform circuit calculates a complex gain of each path of the input signal by inverse-transforming the plurality of pilot symbols extracted by the first extracting circuit. The detecting circuit detects at least one of a power value and a mean amplitude of the input signal, and the coefficient determining circuit determines a coefficient corresponding to the at least one of the power value and the mean amplitude detected by the detecting circuit. The second extracting circuit extracts complex gains having a power larger than a threshold obtained by multiplying the coefficient determined by the coefficient determining circuit by a value obtained by integrating the power for a period of time, wherein the power is obtained from the complex gains of each path of the input signal calculated by the inverse Fourier transform circuit. The second Fourier transform circuit Fourier-transforms the extracted complex gains from the second extracting circuit to obtain a corresponding second Fourier-transformed signal, and the equalizing calculation circuit equalizes the input signal using the second Fourier-transformed signal.

According to another aspect of the present invention, an equalizer circuit includes first and second Fourier transform circuits, first and second extracting circuits, an inverse Fourier transform circuit, a detecting circuit, a coefficient determining circuit, and an equalization calculating circuit. The first Fourier transform circuit Fourier-transforms an input signal and outputs a corresponding first Fourier-transformed signal, and the first extracting circuit extracts a plurality of pilot symbols from the first Fourier-transformed signal. The inverse Fourier transform circuit calculates a complex gain of each path of the input signal by inverse-transforming the plurality of pilot symbols extracted by the first extracting circuit. The detecting circuit detects at least one of a power value and a mean amplitude of the input signal, and the coefficient determining circuit determines a coefficient corresponding to the at least one of the power value and the mean amplitude detected by the detecting circuit. The second extracting circuit extracts complex gains having a sum of absolute values of real parts and imaginary parts of complex gains, larger than a threshold obtained by multiplying a value by the coefficient, wherein the value is calculated by integrating the sum of the absolute value of the real part and the absolute value of the imaginary part of the complex gain calculated by the inverse Fourier transform circuit with respect of each path of the input signal for a period of time. The second Fourier transform circuit Fourier-transforms the extracted complex gains from the second extracting circuit to obtain a corresponding second Fourier-transformed signal, and the equalizing calculation circuit equalizes the input signal using the second Fourier-transformed signal.

BRIEF DESCRIPTION OF THE DRAWINGS

The above and other aspects and features of the present invention will become readily apparent from the detailed description that follows, with reference to the accompanying drawings, in which:

FIG. 5 (B) illustrates frequency characteristics of a band-limited transmission function;

FIG. 6 (B) illustrates a time response of a received signal of a band-limited example;

DETAILED DESCRIPTION OF EMBODIMENTS

Figure 1:
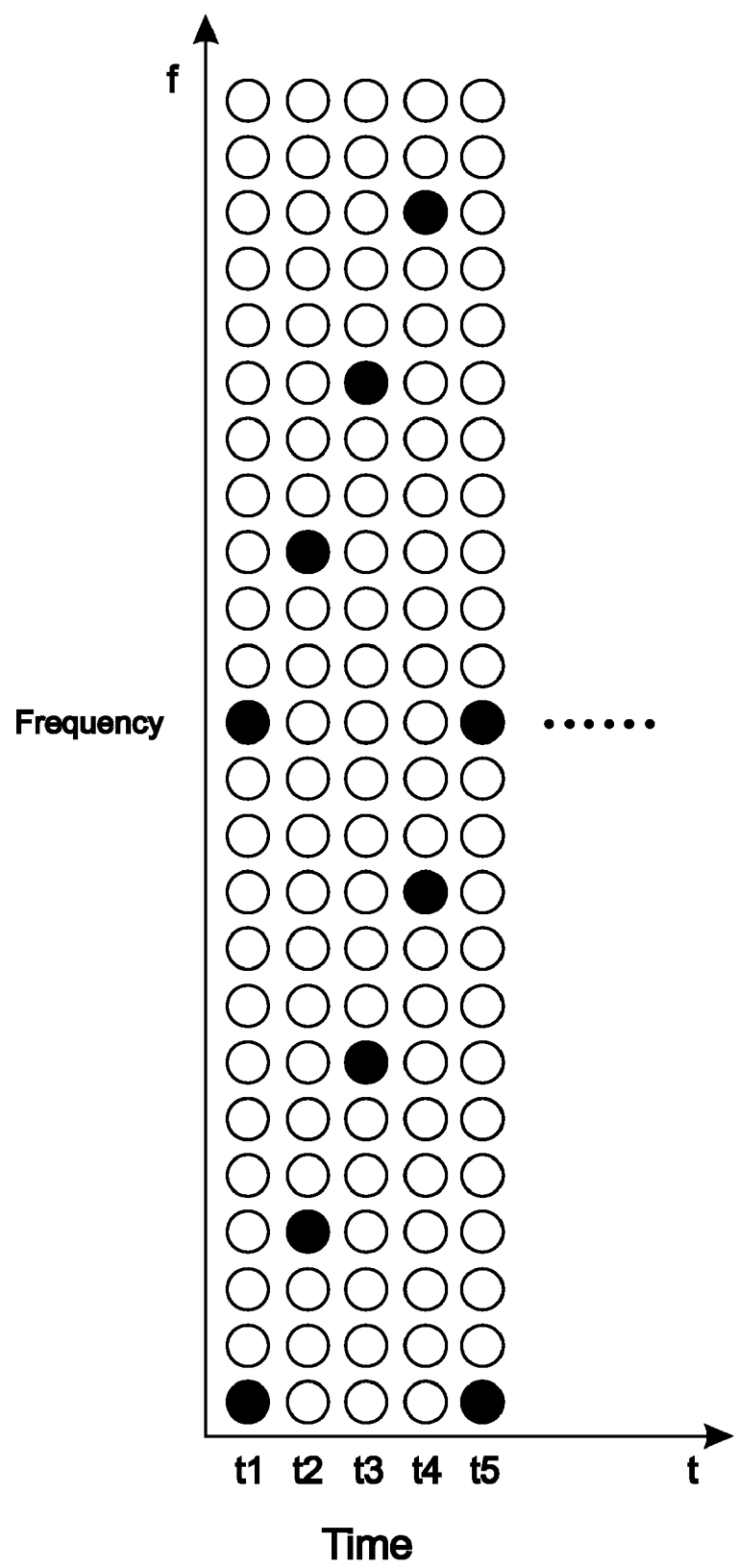
FIG. 1 illustrates an example of a frame structure of an OFDM signal.

The present invention will be described below with reference to a number of preferred, but non-limiting, embodiments of the invention. Initially, however, attention is directed to FIG. 1, which illustrates an exemplary frame structure of an OFDM signal. In particular, FIG. 1 illustrates a mapping relationship between pilot symbols and data symbols, where carriers are arranged from bottom to top in ascending order of frequency, and OFDM symbols are arranged from the left to right in time order. Each black circle denotes of the figure denotes a pilot symbol, and each white circle denotes a data symbol. In this particular example, the same symbol mapping occurs at a period of once per four OFDM symbols. The frame structure of FIG. 1 is presented as an example only, and the embodiments which follow are not limited thereby.

Figure 2:
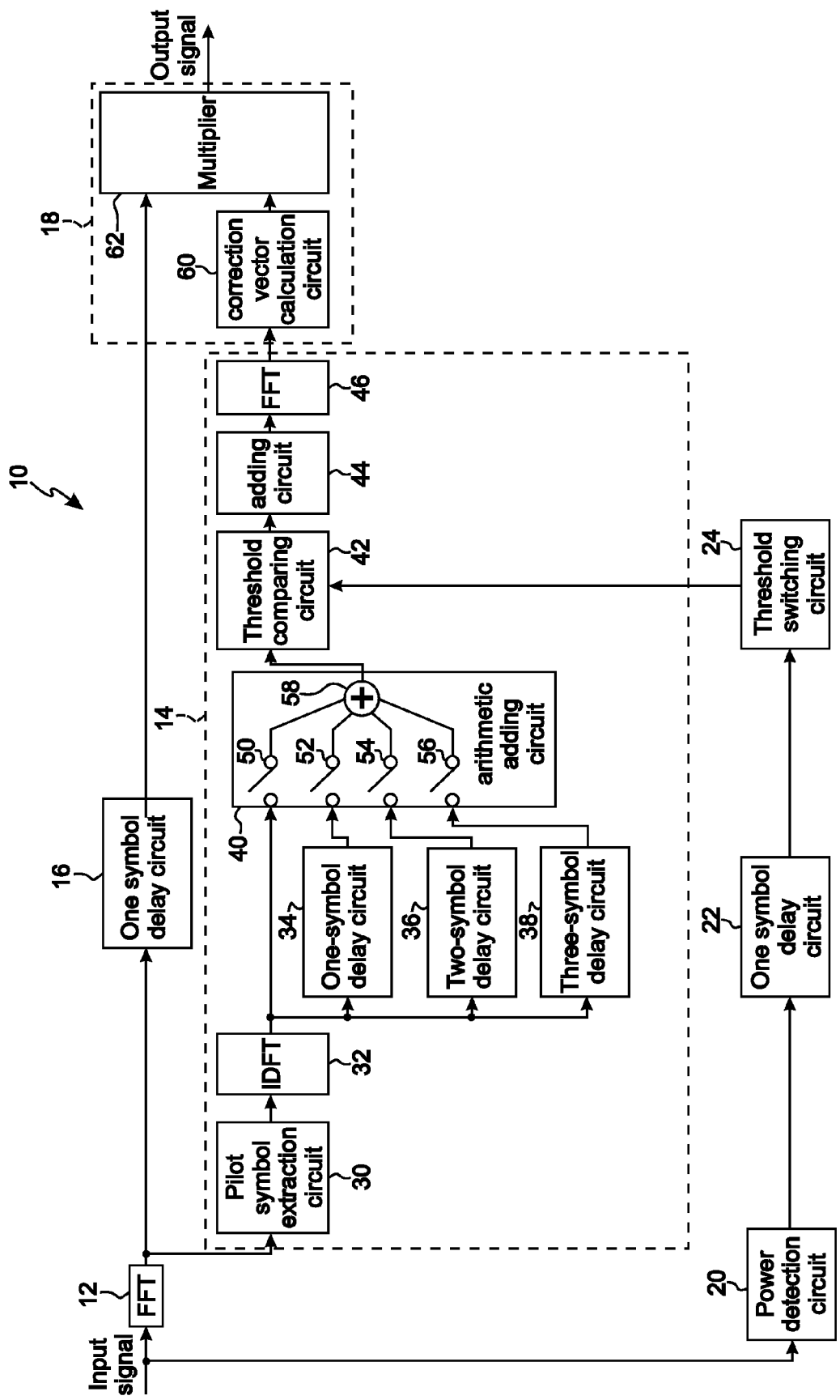
FIG. 2 is a block diagram illustrating an equalizer according to an embodiment of the present invention.

FIG. 2 is a block diagram of an equalizer 10 according to an embodiment of the present invention. Briefly, the equalizer 10 Fourier-transforms an OFDM input signal, conducts simultaneously channel estimation, and equalizes the Fourier-transformed input signal corresponding to the channel estimation results to output an equalized signal thereof. Referring additionally to FIG. 1, the equalizer 10 is configured, for example, to (a) demodulate a current (for example, t3) OFDM symbol using pilot symbols of the current OFDM symbol, (b) demodulate a preceding one-symbol (for example, t2) OFDM symbol using pilot symbols of the current (for example, t3) OFDM symbol and a preceding two-symbol (for example, t1) OFDM symbol, and (c) demodulate an OFDM symbol before one-symbol (for example, t4) using pilot symbols of a current (for example, t5) OFDM symbol, of an OFDM symbol before one symbol (for example, t4), of an OFDM symbol before two symbols (for example, t3), and of an OFDM symbol before three symbols (for example, t2).

Referring to FIG. 2, the equalizer 10 includes a fast Fourier transform circuit 12, a channel estimation unit 14, a one-symbol delay circuit 16, an equalizing calculation unit 18, a power detection circuit 20, a one-symbol delay circuit 22, and a threshold switching circuit 24.

The fast Fourier transform circuit 12 Fourier-transforms the input signal with respect of each one OFDM symbol, and outputs the transformed input signal to the channel estimation unit 14 and the one-symbol delay circuit 16.

The channel estimation unit 14 includes a pilot-symbol extracting circuit 30, a discrete inverse Fourier transform circuit 32, a one-symbol delay circuit 34, two-symbol delay circuit 36, three-symbol delay circuit 38, an arithmetic adding circuit 40, a threshold comparing circuit 42, an adding circuit 44, and a fast Fourier transform circuit 46.

The pilot-symbol extracting circuit 30 extracts pilot-symbols from the Fourier-transformed input signal containing a mixture of pilot symbols and data symbols. The pilot symbols are scattered at a predetermined period in the input signal, and the pilot-symbol extracting circuit 30 extracts the pilot symbols using the predetermined period obtained from an external source. A specific image of extracting thereof will be hereinafter explained. To simplify the explanation, the pilot symbol is represented by P, and the data symbol is represented by D. For example, assuming that the data array is DDDPD-DDPDDDPDDD, the extracting image is replacing D by 0 (zero). In the above-mentioned case, the extracted data array is 000P000P000P000.

The discrete inverse Fourier transform circuit 32 is connected to the pilot-symbol extracting circuit 30, conducts a discrete inverse Fourier transform so as have a delay time span which is sufficiently long complete an estimation process, and obtains complex gains of each of incoming paths. In addition, the complex gain includes not only a transmission function of a propagation path caused by a delay path, but also a noise and calculation error. The discrete inverse Fourier transform circuit 32 holds a current calculation result until a next calculation is done.

Figure 3:
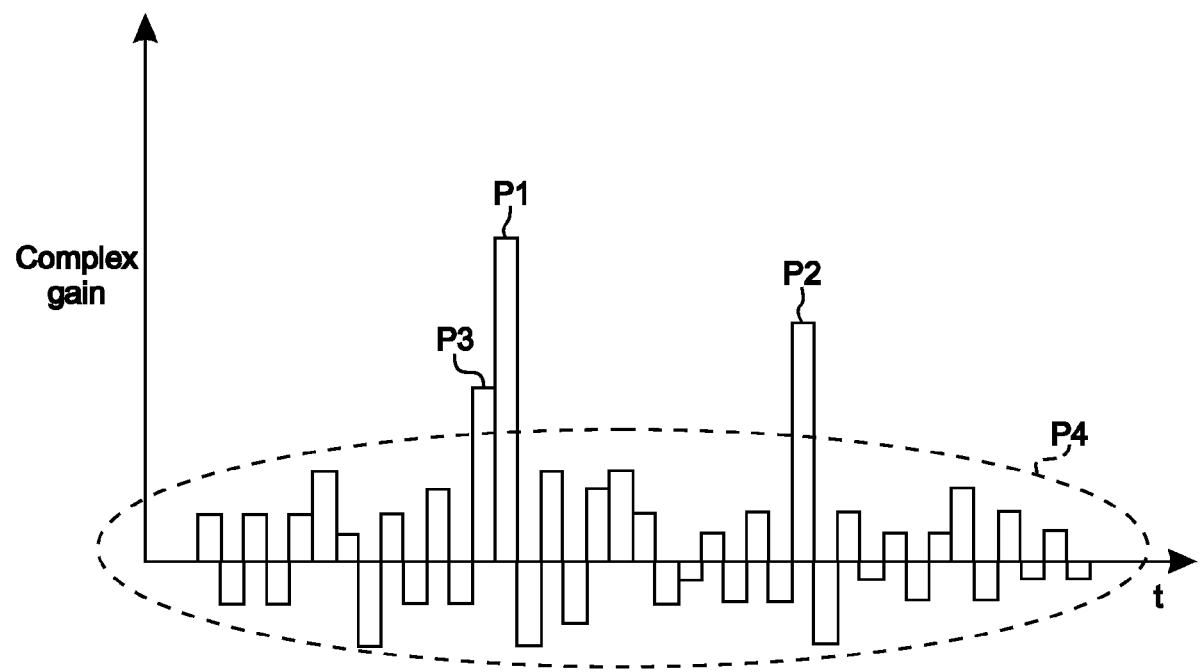
FIG. 3 is a graph showing complex gains of incoming paths obtained by discrete inverse Fourier transformation.

FIG. 3 is a graph showing complex gains of each of incoming paths obtained by the discrete-inverse-Fourier-transform circuit. In FIG. 3, a path P1 having the maximum complex gain is estimated to be a signal coming directly from an OFDM-signal transmitting apparatus to an OFDM-signal receiving apparatus. In the meantime, paths P2, P3 are estimated to be signals reflected by obstacles such as buildings, etc., and arriving via side paths which are longer than paths of the directly incoming signals. Furthermore, a path P4 is estimated to be a signal due to calculation errors caused by noise, or caused by pilot-symbols not being placed equally over the fast Fourier transform points.

The discrete inverse Fourier transform circuit 32 conducts the transform using the formula shown below. In the formula, a sine-wave coefficient $e^{-j\theta}$ for the discrete-inverse-Fourier-transform needs to be changed with respect to each of the OFDM symbols because the coefficient is varied by the position where the pilot symbol is inserted.

$$SP\_res(t, l) = \sum_{k=0}^{sp\_num} SP\_sc(t, k)e^{j2\pi[fsp1(t)+stp^*k]^*l//fft\_num}$$

In the above formula, t is an OFDM-symbol time, l is a delay time, k is a pilot-symbol number, SP_res(t,l) is a complex gain, SP_sc(t,k) is a transmission function and noise superposed on the pilot symbols, fsp1(t) is a sub-carrier position corresponding to the pilot-symbol having the lowest frequency, stp is a sub-carrier frequency spacing of the pilot symbol, sp_num is a number of the pilot symbols used for the propagation-path estimation, and fft_num is a number of the Fourier transform points. Although a discrete inverse Fourier transform circuit is utilized in the present embodiment, a fast Fourier transform circuit is also applicable.

The one-symbol delay circuit 34 (composed, for example, by RAM) delays the complex gain from the discrete inverse Fourier transform circuit 32 by a time corresponding to one symbol, and holds the above delayed complex gain. Subsequently, one-symbol delay circuit 34 outputs the delayed complex gain correspondingly to a reading request. Similarly, both of the two-symbol delay circuit 36 and the three-symbol delay circuit 38 may consist of RAM, where the two-symbol delay circuit 36 delays the complex gain from the discrete inverse Fourier transform circuit 32 by a time corresponding to two symbols, and the three-symbol delay circuit 38 delays the complex gain from the discrete inverse Fourier transform circuit 32 by a time corresponding to three symbols. Both of these delay circuits hold the delayed complex gains, and then output the delayed complex gain in response to a reading request.

The arithmetic adding circuit 40 includes a switching unit composed by switches 50 to 56 and an adder 58. The switch 50 connects the discrete inverse Fourier transform circuit 32 and the adder 58, the switch 52 connects the one-symbol delay circuit 34 and the adder 58, the switch 54 connects the two-symbol delay circuit 36 and the adder 58, and the switch 56 connects the three-symbol delay circuit 38 and the adder 58. The arithmetic adding circuit 40 adds the complex gain from the discrete inverse Fourier transform circuit 32 and each of the delayed complex gains from the one-symbol delay circuit 34, the two-symbol delay circuit 36, and the three-symbol delay circuit 38.

There are three possible states of combination of switching for connecting signals to be added, that is, a first state where only the switch 52 is turned on, a second state where only the switches 50, 54 are turned on, and a third state where all the switches 50, 52. 54, and 56 are turned on. The first state where only the switch 52 is turned on is for carrying out the propagation-path estimation using only one pilot symbol in the OFDM symbol. The second state where only the switches 50, 54 are turned on is for carrying out the propagation-path estimation using only two pilot symbols in the OFDM symbol. The third state where all the switches 50, 52, 54, and 56 are turned on is for carrying out the propagation-path estimation is using only four pilot symbols in the OFDM symbol.

In the first state where only the switch 52 is turned on, the arithmetic adding circuit 40 outputs directly the one-symbol-period-delayed complex gain from the discrete inverse Fourier transform circuit 32.

In the second state where only the switches 50, 54 are turned on, the arithmetic adding circuit 40 adds the complex gains from the discrete inverse Fourier transform circuit 32 and the complex gain delayed by a two-symbol period, and outputs the adding result.

Figure 4:
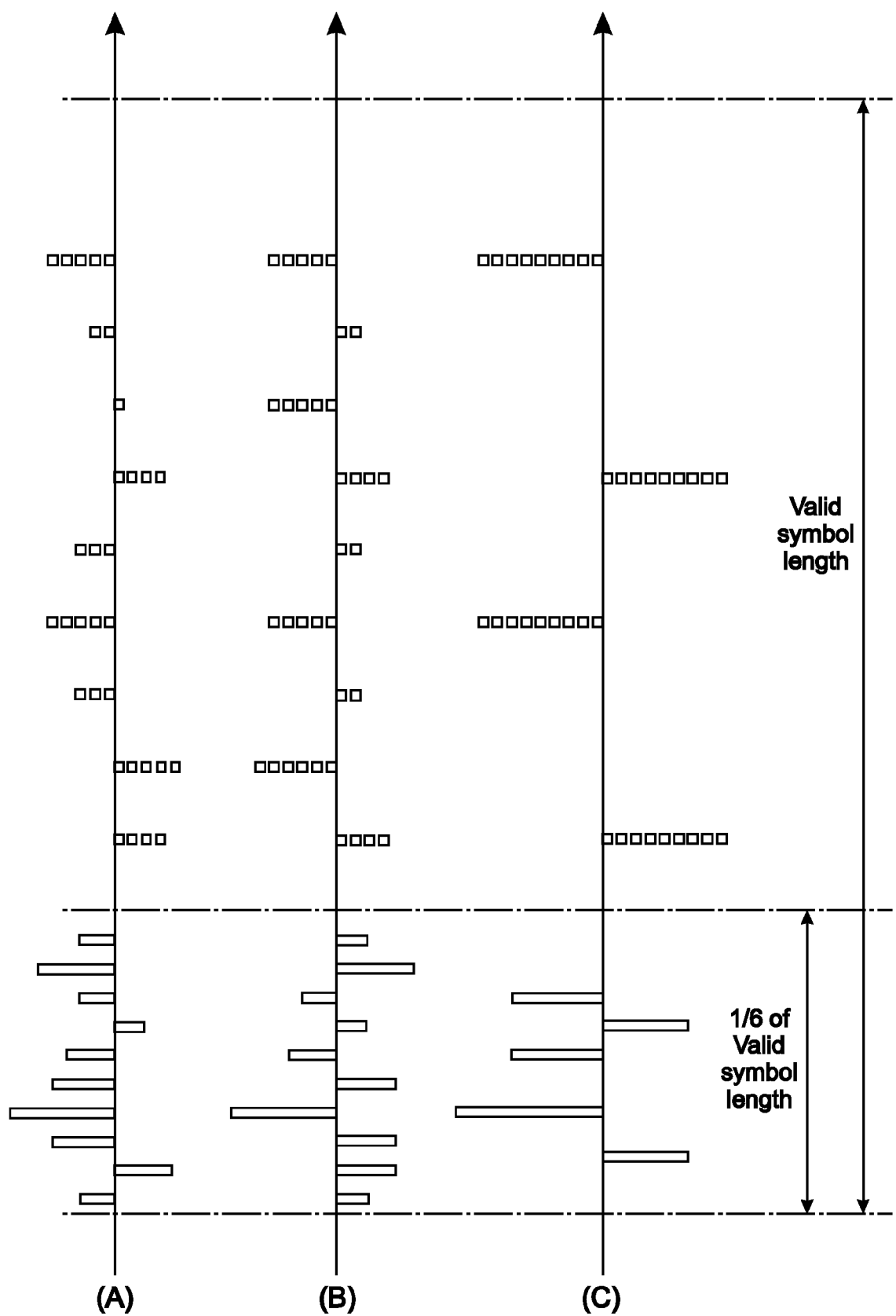
FIG. 4 includes a timing diagram (A) showing a relationship between time and real parts of complex gains of a signal, a timing diagram (B) showing a relationship between time and real parts of complex gains of a signal delayed by two-symbol period, and a timing diagram (C) showing an addition result of the timing diagrams (A) and (B)

Adding results in the case where two signals are added by the arithmetic adding circuit 40 will now be explained with reference to FIG. 4. Timeline (A) of FIG. 4 shows a relationship between time and real parts of complex gains of signals. The solid line of the graph shows real parts having a length less than one sixth of the valid symbol length, and the broken line shows real parts having a length larger than one sixth of the valid symbol length. In other words, the real parts shown by the solid line in the graph are not components to be added by the adder 58. In addition, timeline (B) of FIG. 4 is a graph showing a relationship between time and real parts of complex gains of the signals of timeline (A) delayed by a two-symbol period. Again, the solid line of timeline (B) shows real parts having a length less than one sixth of the valid symbol length, and the broken line shows real parts having a length larger than one sixth of the valid symbol length. Timeline (C) of FIG. 4 (C) is obtained by adding the complex gain shown by timeline (A) and the complex gain shown by timeline (B) using the adder 58.

In the third state where all the switches 50, 52, 54 are turned on, opposite phase components of the complex gain from the discreet inverse Fourier transform circuit 32 and the delayed complex gains from the one-symbol delay circuit 34, two-symbol delay circuit 36, and the three-symbol delay circuit 38, the opposite phase components cancel each other to left the difference between the opposite phase components, and the same phase components of the complex gains are added to be left, as in the state where only the switches 50, 54 are turned on.

In the OFDM symbols having pilot symbols placed equally in the sub-carrier spacing, a delay time width of the complex gains during which the estimation can be done theoretically is not larger than an inverse number of the sub-carrier spacing of the pilot symbol corresponding to the valid OFDM symbol width. For example, in ground digital broadcasting system, one pilot symbol is placed to 12 sub-carriers. Consequently, the delay time width of the complex gains, during which the estimation can be done theoretically, can be obtained by arithmetic adding using four complex gains in the state where all the swatches 50 to 56 are turned on, and then the delay time width is one third of the valid OFDM symbol width. Meanwhile, in the state where only the switches 50, 54 are turned on, the delay time width is one sixth of the valid OFDM symbol width, and in the state where only the switch 52 is turned on, the delay time width is one twelfth of the valid OFDM symbol width. The threshold comparing circuit 42 and the adding circuit 44 operate correspondingly to the delay time widths thereof.

The threshold comparing circuit 42 will be explained, as below. The threshold comparing circuit 42 eliminates noise components and calculation errors of the inputted complex gains.

As explained before, the complex gains calculated by inverse Fourier transform within the delay time width, during which the estimation can be done, includes not only transmission function of the propagation path by delay path but also the noise components and calculation errors. The noise components are superposed on the pilot symbols. In addition, the calculation errors are caused by that the pilot symbols are not equally placed all over the FFT points.

Figure 5A:
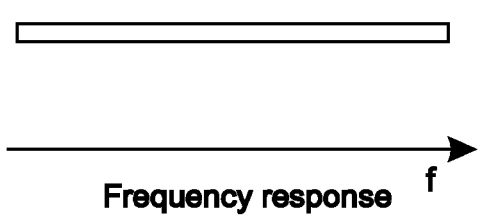
FIG. 5 (A) illustrates frequency characteristics of a not-band-limited transmission function.
Figure 5B:
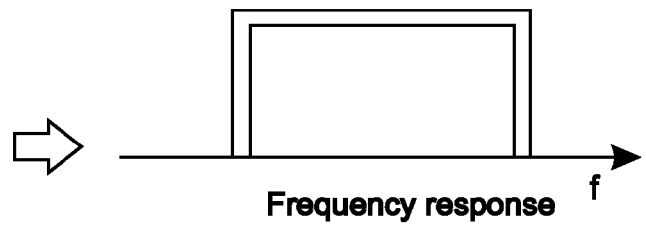
Figure 6A:
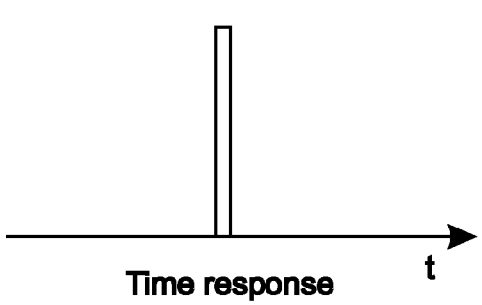
FIG. 6 (A) illustrates a time response of a received signal in a not-band-limited example.
Figure 6B:
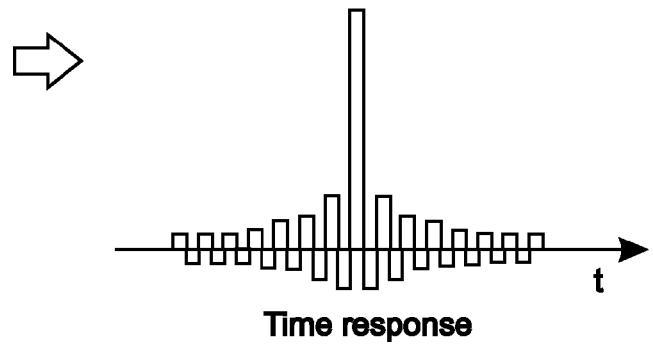

The above-mentioned calculation errors will be explained in details, as below. In regular OFDM modulation method, the transmission is done using the number of sub carriers less than the number of the FFT points in order to avoid aliasing occurring during demodulation. Therefore, the complex gains calculated by inverse Fourier transform within the delay time width, during which the estimation can be done, becomes the same as the band-limited transmission function, as shown in FIG. 5(B). In addition, variations in time response of the band-limited case are as shown in FIG. 6. However, since actual transmission function of the propagation path is not band-limited (band-limiting is usually done in receiving apparatus), calculation errors are caused by inverse-Fourier transform. Consequently, the above-mentioned band-limiting influence or noises need to be eliminated in order to conduct accurate estimation of the propagation path.

In order to reduce the influences by the noises and the calculation errors, the threshold comparing circuit 42 integrates the complex gains for the complex-gain time width, sets a relative threshold based on the integration result, and outputs only the complex gains larger than the threshold. The threshold comparing circuit 42 conducts the threshold comparing using the following formula.

$$SP\_ph(t, l) = \begin{cases} SP\_res(t, l) & SP\_res(t, l)^2 \cdot \geq Pf\_th(t)^* \sum_{k=0}^{L} SP\_res(t, k)^2 \\ 0 & SP\_res(t, l)^2 \cdot < Pf\_th(t)^* \sum_{k=0}^{L} SP\_res(t, k)^2 \end{cases}$$

In the above formula, t is the OFDM symbol time, l is the delay time, L is the complex gain time width, k is the pilot symbol number, SP_ph (t,l) is the threshold comparing output, SP_res (t,l) is the complex gain, and Pf_th(t) is the threshold calculation coefficient, wherein 1>Pf_th(t).

In other words, the threshold comparing circuit 42 obtains the power of each path by calculating the second power of the complex gain, which is discrete-Fourier transformed and calculated by the arithmetic adding circuit 40, and integrates all the powers or the power during a required time length (L in the above formula) among the powers calculated at the discrete time point. Subsequently, the threshold comparing circuit 42 sets a relative threshold (the right side of the above formula) by multiplying the integrated power by the threshold calculation coefficient Pf_th (t), and extracts the path having a power larger than the threshold. Hereinafter, the threshold obtained by multiplying the integrated power by the threshold calculation coefficient Pf_th (t) is referred to as relative threshold. In addition, the threshold calculation coefficient Pf_th (t) is an input from the after-mentioned threshold switching circuit 24.

Figure 7:
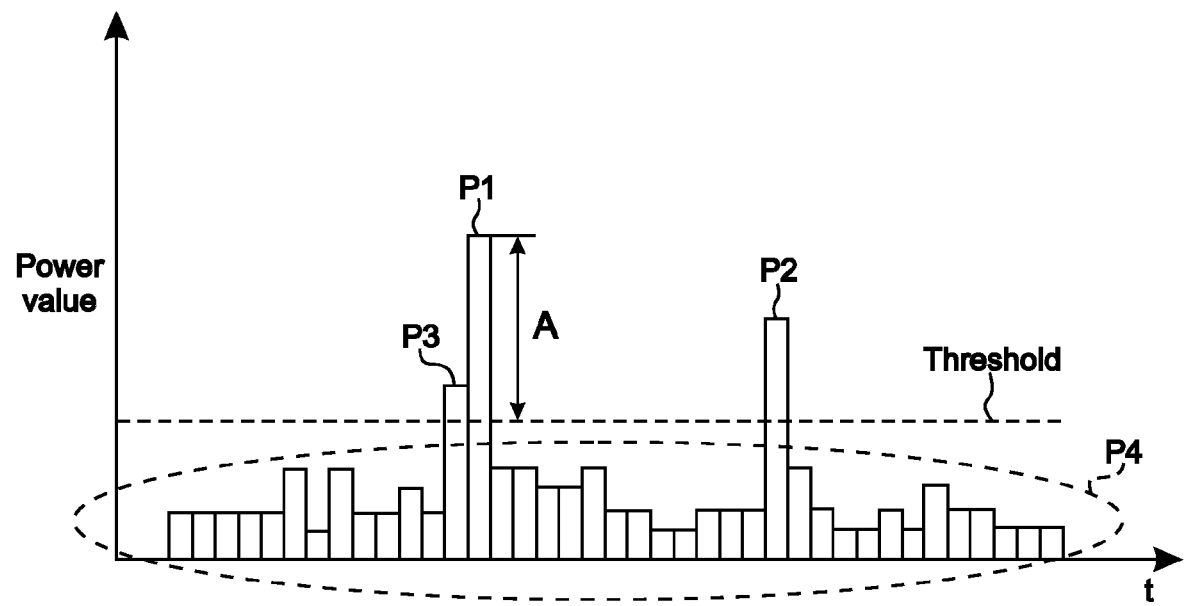
FIG. 7 illustrates a power of each incoming path calculated from a complex gain.
Figure 8:
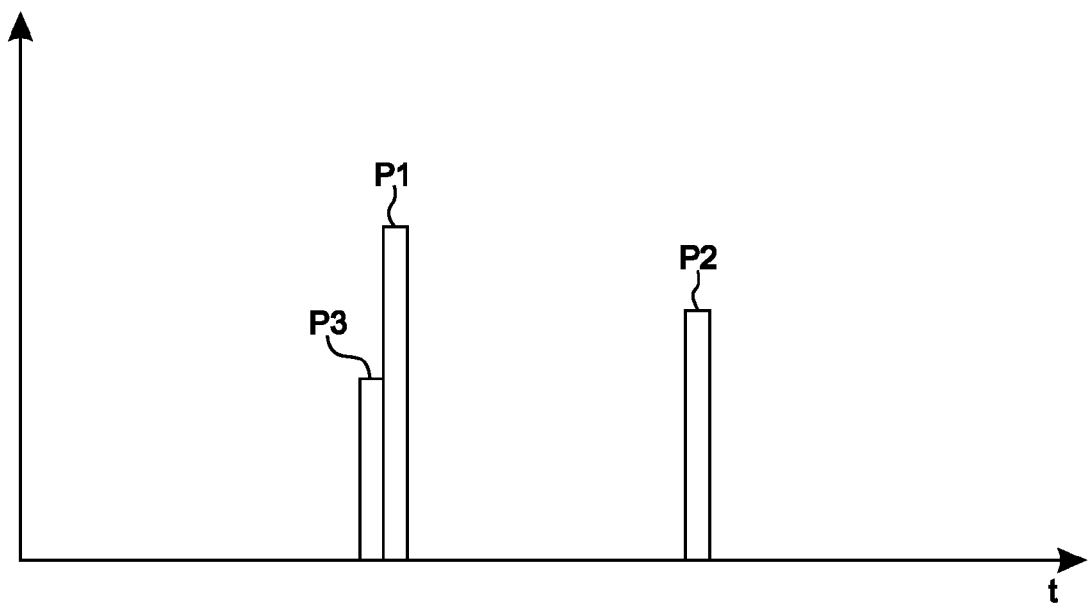
FIG. 8 is graph showing a complex gain of a path extracted by a threshold comparing circuit.

FIG. 7 is a graph showing the power value of each incoming path calculated using the complex gain.

The threshold shown in FIG. 7 is the relative threshold obtained by multiplying the integrated power by the threshold calculation coefficient Pf_th (t). The threshold comparing circuit 42 outputs directly the complex gains of the paths correspondingly to the paths within from the maximum power to a predetermined power A, and output zero correspondingly to the path not extracted. Consequently, the paths from 1 to 3 are extracted.

In addition, according to the first embodiment, the threshold calculation coefficient Pf_th (t) is calculated by the power detection circuit 20 and the threshold switching circuit 24.

The OFDM signal before being Fourier transformed by the fast Fourier transform circuit 12 is an input of the power detection circuit 20. The power detection circuit 20 detects the power in the received signal corresponding to one-symbol of the OFDM signal. As methods for detecting the power, various methods can be used. As one of the power detection circuit 20, a current detecting circuit having voltage output function and a multiplier can be installed so as to detect the power by multiplying a voltage proportional to the current detected by the current detecting circuit and a voltage of the input OFDM signal by the multiplier.

The one-symbol delay circuit 22 is placed on the subsequent stage of the power detection circuit 20. The one-symbol delay circuit 22 delays the detected power value from the power detection circuit 20 by one OFDM symbol. The complex gain of the calculation object by the threshold comparing circuit 42 and the threshold calculation coefficient Pf_th (t) generated by the received power become corresponding to each other by delaying in the one-symbol delay circuit 22.

The detected power value delayed by the one-symbol delay circuit 22 is an input of the threshold switching circuit 24. The threshold switching circuit 24 calculates the threshold calculation coefficient Pf_th (t) for obtaining the relative threshold based on the input detected power value, and outputs the calculated calculation coefficient Pf_th (t) to the threshold comparing circuit 42. The threshold calculation coefficient Pf_th (t) is calculated by the following formula.

$$Pf\_th(t) = \begin{cases} TH1 & \text{sym\_pow}(t) > comp12 \\ TH2 & comp12 \geq \text{sym\_pow}(t) > comp23 \\ TH3 & comp23 \geq \text{sym\_pow}(t) \end{cases}$$

In the above formula, t is the OFDM symbol time, sym_pow (t) is the one-symbol-delayed detected power value, comp 12 and comp 23 are the criteria compared to sym_pow (t) having a relation of comp 12>comp 23. Furthermore, TH1, TH2, and TH3 are three kinds of threshold calculation coefficients obtained by comparing comp12 and comp 23 to sym_pow (t). In addition, three kinds of threshold calculation coefficients are less than 1, and have a relation of TH1<TH2<TH3.

The above formula shows that the threshold calculation coefficient Pf_th (t) is set to be a smaller value correspondingly to the complex gain having a larger detected power value and the threshold calculation coefficient Pf_th (t) is set to be a larger value correspondingly to the complex gain having a smaller detected power value. Consequently, the relative threshold of the complex gain having a larger detected power value becomes smaller as shown in FIG. 9 (A), and the relative threshold of the complex gain having a smaller detected power value becomes larger as shown in FIG. 10 (A).

Figure 9:
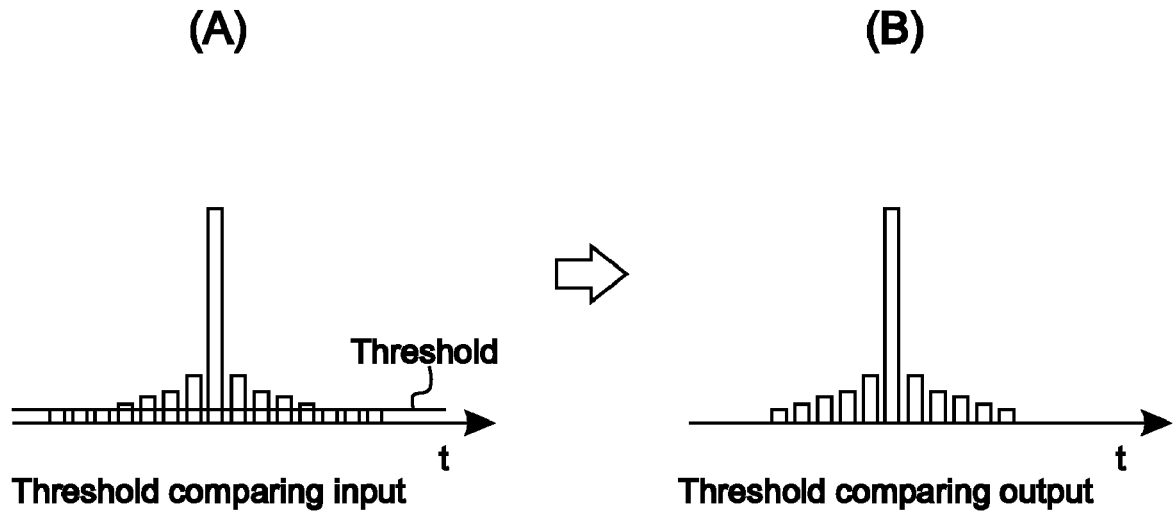
FIG. 9 is a graph showing a sample of a relative threshold and extracted paths generated by a threshold comparing circuit.
Figure 10:
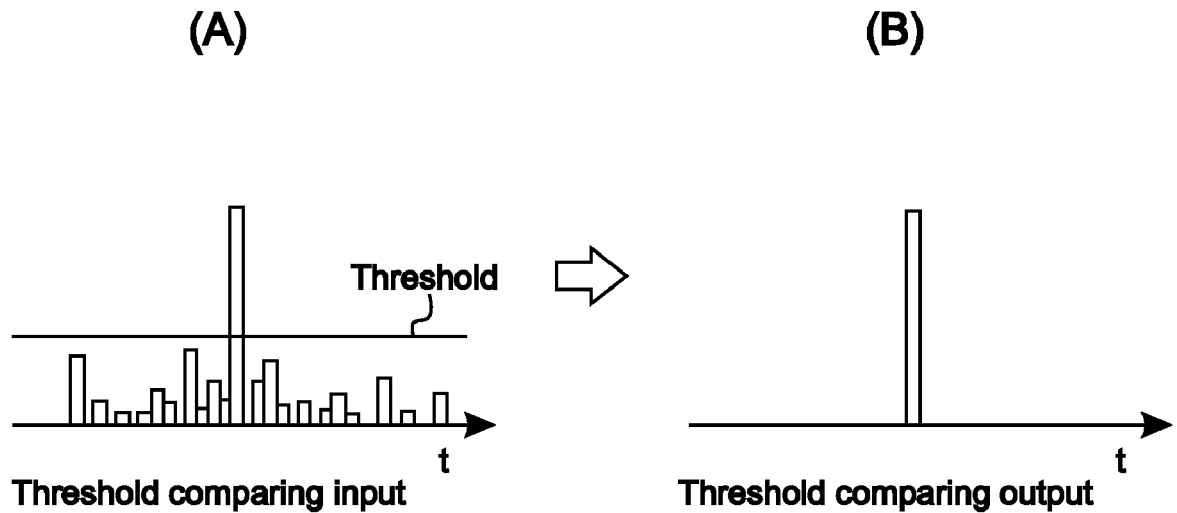
FIG. 10 is a graph showing another sample of a relative threshold and extracted paths generated by a threshold comparing circuit.

In the case where the power value is larger, the ratio of unnecessary power such as noise, etc. is smaller than in the case where the power value is smaller, and the precision of propagation path estimation is improved due to the lowered relative threshold (cf. FIG. 9 (B)). On the contrary, in the case where the power value is smaller, since the ratio of unnecessary power is larger, the heightened relative threshold eliminates the complex gain generated by noise (cf. FIG. 10 (B)).

In addition, according to the first embodiment, it is possible to configure that threshold calculation coefficients other than the three kinds of threshold calculation coefficients are settable.

The adding circuit 44 is installed on the subsequent stage of the threshold comparing circuit 42. The adding circuit 44 outputs the output from the threshold comparing circuit 42 after adding 0 (zero) to the output. As explained before, delay time width that can be estimated theoretically is not larger than the inverse number of the sub carrier spacing of the pilot symbol correspondingly to the valid OFDM symbol length. The complex gain having noises and calculation errors lessened by the threshold comparing circuit 42 has only the above-mentioned delay time width, and some value needs to be placed at all the Fourier transform points in order to estimate the propagation path corresponding to all the sub carriers using Fourier transform. For the above-mentioned purpose, in the adding circuit 44, the zero needs to be added in the time region beyond the delay time width calculated by the threshold comparing circuit 42. In other words, the case where a value having some power is added in the time region beyond the delay time width calculated by the threshold comparing circuit 42 means that an incoming path exists at a delayed time point corresponding to the time point where the value is added. Adding the zero also means that no incoming path exists at the delayed time point, and then adding zero is very important in the adding circuit 44.

The fast Fourier transform circuit 46 fast-Fourier-transforms the output from the adding circuit 44, and outputs the transformed output as the propagation-path estimation result to the equalizing calculation unit 18. The propagation-path estimation result indicates influences on the phase and amplitude of the OFDM signal due to various causes on the propagation path. The equalizing calculation unit 18 corrects the influences on the phase and amplitude of the OFDM signal, using the propagation-path estimation result.

The equalizing calculation unit 18 consists of a correction vector calculation circuit 60 and a multiplying circuit 62. The correction vector calculation circuit 60 extracts the phase component of the propagation path estimation corresponding to each of the sub carriers. Since the propagation path estimation value includes real and imaginary parts, the phase components is generated by calculation using the real and imaginary parts. Then the estimation value is outputted after being transferred to the complex conjugate value of the phase components. That is, the real part is directly outputted and the imaginary part is outputted after being inverted. Wherein, the correction vector calculation circuit 60 calculates using the following formula.

$$\cos\left(\tan^{-1}\left(\frac{\text{Im}}{\text{Re}}\right)\right) - j\sin\left(\tan^{-1}\left(\frac{\text{Im}}{\text{Re}}\right)\right)$$

The multiplying circuit 62 complex multiplies the value of each of the sub carriers by the output from the correction vector calculation circuit 60, wherein the value is obtained by fast-Fourier transforming the received OFDM signal. By the multiplication, phase rotations received on the propagation path can be cancelled. The multiplying circuit 62 outputs the multiplication result as the demodulated data.

In the above explanation, the case where the correction vector calculation circuit 60 extracts only the phase components of the transmission estimation corresponding to each of the sub carriers has been described, however, the correction vector calculation circuit 60 can be configured to extract the phase component and the amplitude.

In the above-mentioned case, the correction vector calculation circuit 60 generates the correction vector, which is an inverse number with respect of each of the sub carriers, using the following formula.

$$\text{SubC\_T} = \frac{\text{Re}[SubC] - j\text{Im}[SubC]}{\text{Re}[SubC]^2 + \text{Im}[SubC]^2}$$

Wherein, Subc_T is correction vector, and SunC is the estimation result of the propagation path with respect of each of the sub carriers. As shown in the above formula, the correction vector is obtained by calculating an inverse number of the conjugate complex of the estimation result of the propagation path. The multiplication circuit 62 complex-multiplies the value corresponding to each of the sub carriers obtained by fast Fourier transforming the received OFDM signal and the correction vector by calculated by the correction vector calculation circuit 60. Consequently, phase rotations occurring on the propagation path can be cancelled, and amplitude variations thereof can be also corrected. The above-mentioned configuration can be corresponded to quadrature amplitude modulation (OAM).

According to the first embodiment of the invention, arithmetic adding is selectively done by the arithmetic adding circuit 40, however, in the case where the modulation is always carried out by one-symbol, it is possible to configure that the one-symbol delay circuits, 16, 22, 34, 36, and 38, and the arithmetic adding circuit 40 are not installed. In other words, it is configured that the output from the fast Fourier transform circuit 12 is directly given to the equalizing calculation circuit 18, the output from the power detection circuit 20 is directly given to the threshold comparing circuit 42, and the output from the discrete inverse Fourier transform circuit 32 is directly given to the threshold comparing circuit 42.

In addition, in the case where the one-symbol-before OFDM symbol is always demodulated using the pilot symbol of the current OFDM symbol and the pilot symbol of the two-symbol-before OFDM symbol, it is possible to configure that the one-symbol delay circuit 34 and the three symbol delay circuit 38 are not installed, and the arithmetic adding circuit 40 adds the output from the discrete inverse Fourier transform circuit 32 and the output from the two-symbol delay circuit 36.

As explained before, since the threshold (the relative threshold according to the first embodiment) is installed so as to eliminate the complex gains having smaller powers such as noises or calculation errors, the propagation-path estimation error becomes smaller and the receiving characteristics to noise is improved. Especially, in the case where the received power is varied by fading, etc., bit error rate thereof is reduced and the receiving characteristics is improved by setting the threshold used for the threshold comparing process after the inverse fast Fourier transformation to be a value adaptive to the variation of the OFDM symbol power.

In a propagation path where variations such as fading, etc. occur, the received signal power always varies, and then the state of larger noise power ratio and the state of a smaller noise power ratio are mixed due to the variation. In the case where less unnecessary signals such as noise are included in the received OFDM symbol, it is preferable that the threshold be lowered, because the valid information ratio is higher. On the contrary, in the case where more unnecessary signals such as noise are included therein, it is preferable that the threshold be heightened in order to eliminate the noise components. As explained before, in a propagation path including fading, more precise propagation path estimation can be done by threshold comparing using a threshold changed correspondingly to variations in the power, than in the case of the conventional path having the fixed threshold.

In addition, according to the method of the present invention, the predetermined repeated calculations are not carried out differently from in the conventional method for direct estimation of complex gains and delay times of the propagation-path, and complex gains necessary for precise estimation of the propagation path can be extracted by one-time calculation. Furthermore, since there is no need to predetermine the number of repeating calculations, even in the case where there are larger number of delay time positions having larger-power complex gains than the number of repeating calculations (in a receiving environment having very large number of delay paths), complex gains at delay time positions necessary for precise estimation of the propagation path cannot be missed. In a receiving environment having very large number of delay paths, the method of the present invention can easily acquire better receiving characteristics than in the conventional method for direct estimation of complex gains and delay times of the propagation-path.

According to the first embodiment, it is configured that the propagation path estimation can be done by one OFDM symbol, two OFDM symbols, or four OFDM symbols, however, in a case where the propagation path condition is changed violently by fast fading, etc., a precise estimation can be done using one symbol. The reason is that different influences of the propagation path characteristics on before-and-after OFDM symbols are reduced, and then the receiving characteristics are improved. In addition, in a case where variation in the transmission function of the propagation path is smaller, a more precise equalization can be done by the propagation path estimation using two symbols or four symbols in the above-mentioned configuration than in the case where the propagation path estimation is done by one symbol.

However, even in the case where the propagation path estimation is done using two or four symbols, since it is configured that the relative threshold is obtained as explained before and is used for the propagation path estimation, influence by variation of fading, etc. can be reduced to a large degree. Furthermore, in the case where the propagation path estimation is done using two OFDM symbols, the spacing of sub carriers of the scattered pilot symbols becomes the same period as six-sub-carrier period. Therefore, the time width of incoming path during which the estimation can be done becomes twice as long as in the case where the propagation path estimation can be done using one symbol. Consequently, it becomes possible that delay paths having longer incoming time are equalized. Furthermore, even in the case where the transmission function of the propagation path varies by fading, etc., estimation errors can be reduced by estimation of the propagation path using scattered pilot symbols included in one OFDM symbol before-and-after the OFDM symbol equalized by propagation path estimation.

Additionally, in the case where the estimation is done using four OFDM symbols, the spacing of sub carriers of the scattered pilot symbols becomes the same period the same period as three-sub-carrier period. Therefore, the time width of incoming path during which the estimation can be done becomes four times as long as in the case where the propagation path estimation can be done using one symbol. Consequently, it becomes possible that delay paths having longer incoming time are equalized. Furthermore, even in the case where the transmission function of the propagation path varies, estimation errors can be reduced by estimation of the propagation path using scattered pilot symbols included in one OFDM symbol before-and-after and two OFDM symbol before the OFDM symbol equalized by propagation path estimation. The influence by variation of fading, etc. and the estimation errors can be more reduced than in a case where the propagation path estimation is done by four signal processors of OFDM symbol using scattered pilot symbols included in one OFDM symbol before, two OFDM symbol before, and three OFDM symbol before the OFDM symbol equalized by propagation path estimation.

According to the first embodiment, a case where the threshold calculation coefficient is obtained by detecting the power of the OFDM signal by the power detection circuit 20 has been explained, however, the embodiment is not limited to the case, it is possible to configure that a circuit for detecting the mean amplitude is installed instead of the power detection circuit 20 and the threshold calculation coefficient is obtained according to the mean amplitude.

Figure 11:
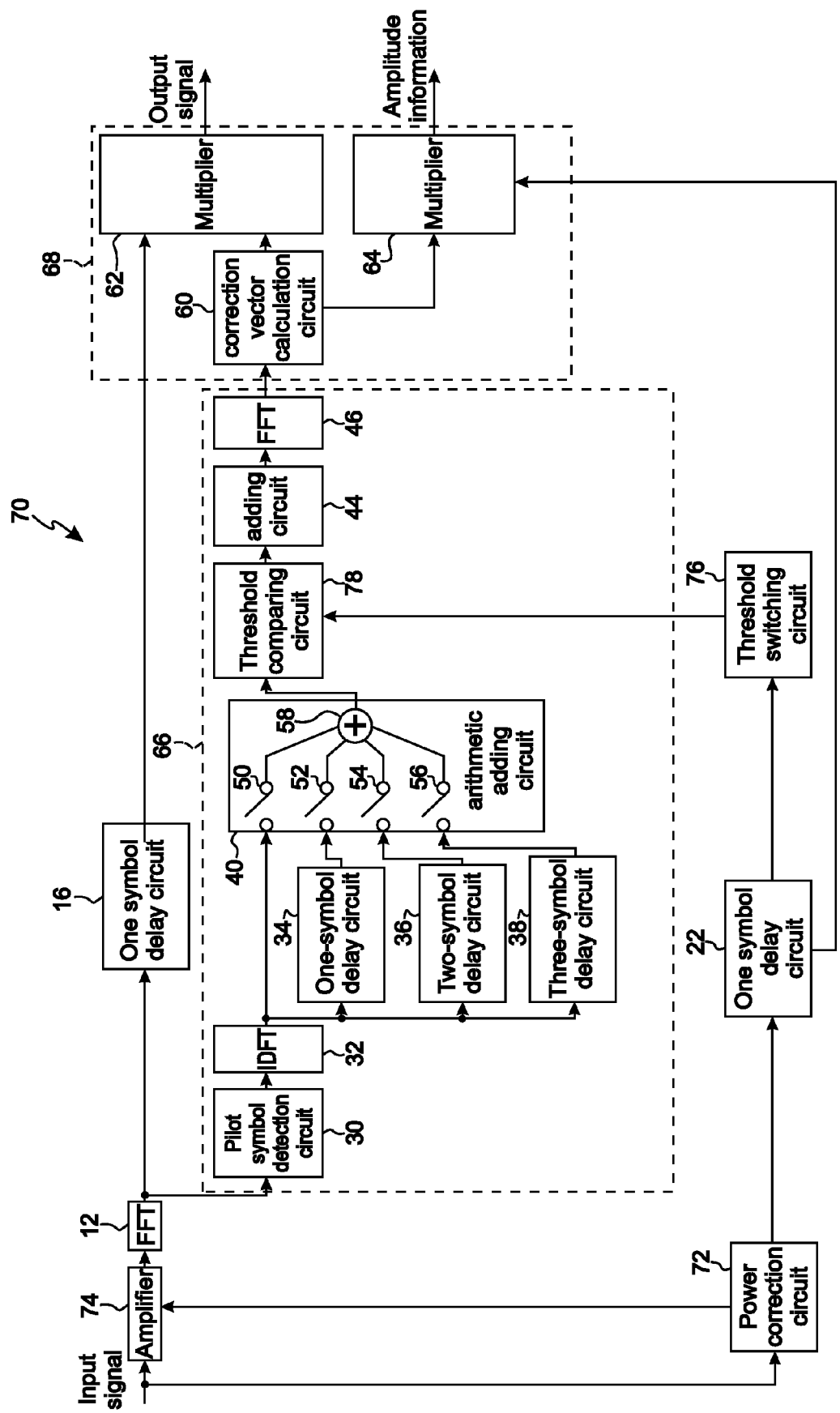
FIG. 11 is a block diagram of an equalizer according to another embodiment of the present invention.

FIG. 11 is a block diagram of an equalizer 70 according to the second embodiment. In the equalizer 70 of the second embodiment, the elements identical to the ones of the equalizer 10 of the first embodiment are given the same numerals and the explanation thereof will be omitted. As shown in FIG. 11, the equalizer 70 of the second embodiment includes a power correction circuit 72, an amplifier 74, and a threshold switching circuit 76.

The power correction circuit 72 is given OFDM signals before being Fourier transformed by the fast Fourier transform circuit 12 and before being amplified by the amplifier 74. The power correction circuit 72 is configured to include the power detection circuit 20 and detects the power of the received signal corresponding to one OFDM signal. Furthermore, the power correction circuit 72 obtains a ratio of the detected power to the reference power and outputs the inverse number of the ratio to the amplifier 74 and the one-symbol delay circuit 22 as a gain. In other words, the combination of the subsequent-stage amplifier 74 and the power correction circuit 72 realizes AGC (auto gain control). Since the configuration of the AGC is a typical AGC configuration, further explanation will be omitted hereinafter. The output power to the subsequent-stage amplifier 74 is set to be corresponding to the reference power by the AGC. Usually, since noise components, etc. are included in input signals thereof, the detected power becomes large than the reference power of the reference signal including no noise components, etc. Consequently, the inverse number of the ratio of the detected power to the reference power becomes smaller than 1.

In the above description, the gain is obtained by detecting the power, however, it is possible to configure that the gain is obtained by the ratio of the mean amplitude to the reference amplitude after detecting the mean amplitude.

The amplifier 74 is configured to have a gain given by the power correction circuit 72. The input OFDM signal is changed to have a power corresponding to the reference power by the amplifier 74, and given to the subsequent-stage fast Fourier transform circuit 12. Consequently, an input dynamic range of the subsequent-stage fast Fourier transform circuit 12 can be set to be narrower than the input dynamic range of the amplifier 74.

Also, a channel estimation unit 66 of the second embodiment installed at the subsequent stage of the fast Fourier transform circuit 12 is configured that the threshold comparing circuit 78 is only installed instead of the threshold comparing circuit 42 of the channel estimation unit 14 according to the first embodiment, and other configurations are the same as in the first embodiment.

A threshold comparing circuit 78 of the second embodiment generates the relative threshold by integrating the sum of the absolute values of the real parts and the imaginary parts of the complex gains, not by integrating the power obtained by calculating the second power of the complex gain as in the first embodiment. The threshold comparing circuit 42 compares the thresholds by generating the relative threshold using the following formula.

$$SP\_ph(t, l) = \begin{cases} SP\_res(t, l) & |Re(SP\_res(t, l))| + |Im(SP\_res(t, l)| \geq Pf\_th(t)^* \\ & \sum_{k=0}^{L} [|Re(SP\_res(t, k))| + |Im(SP\_res(t, k))|] \\ 0 & |Re(SP\_res(t, l))| + |Im(SP\_res(t, l)| < Pf\_th(t)^* \\ & \sum_{k=0}^{L} [|Re(SP\_res(t, k))| + |Im(SP\_res(t, k))|] \end{cases}$$

In the above formula, t is the OFDM symbol time, l is the delay time, L is time width of the complex gain, k is the pilot symbol number, SP_ph (t,l) is the threshold comparing output, SP_res (t,l) is the complex gain, and Pf_th (t) is the threshold calculation coefficient having a relation of 1>Pf_th (t,l).

In other words, the threshold comparing circuit 78 sets the relative threshold (the right side of the above formula) by multiplying an value by the threshold calculation coefficient Pf_th (t), wherein the value is obtained by integrating the sum of the absolute values of the real parts and the imaginary parts of the complex gains discrete-inverse-Fourier transformed and calculated by the arithmetic adding circuit 40, and the threshold comparing circuit 78 extracts a path having a power larger than the relative threshold. Wherein, the threshold calculation coefficient Pf_th (t) is inputted from the threshold switching circuit 76.

The threshold switching circuit 76 is installed at the subsequent stage of the one-symbol delay circuit 22 for delaying the output from the power correction circuit 72 by one-OFDM-symbol period The threshold switching circuit 24 calculates the threshold calculation coefficient Pf_th (t) for obtaining the relative threshold based on the gain one-symbol delayed by the one-symbol delay circuit 22, and outputs the threshold calculation coefficient Pf_th (t) to the threshold comparing circuit 78. The threshold calculation coefficient Pf_th (t) is calculated by the following formula.

$$Pf\_th(t) = \begin{cases} TH1 & comp\_p12 > sym\_gain(t) \\ TH2 & comp\_p23 > sym\_gain(t) \geq comp\_p12 \\ TH3 & sym\_gain(t) \geq comp\_p23 \end{cases}$$

In the above formula, t is the OFDM symbol time, sym_gain (t) is the gain one-symbol delayed, the comps 12 and 13 are criteria compared with the sym_gain (t) having a relation of comp 12<comp 13 (the opposite relation to the first embodiment). The TH1, Th2, and Th3 are three kinds of the threshold comparing coefficients obtained from the comparing results of the comps 12 and 23 to the sym_gain (t). Wherein, the values of the three kinds of threshold calculation coefficients are less than 1, having a relation of TH1<TH2<TH3.

According to the first embodiment, in the case where the power of the received signal is larger, the output from the power detection circuit 20 becomes larger and then the threshold-multiplying coefficient Pf_th (t) becomes smaller, however, according to the second embodiment, in the case where the power is larger, the threshold multiplying coefficient Pf_th (t) becomes smaller. Since the received signal including noise, etc. has a larger power and the power correction circuit 72 calculates the gain so that the power thereof becomes closer to the reference power, the gain becomes smaller and the threshold multiplying coefficient Pf_th (t) becomes smaller by the above described comparing formula. On the contrary, in the case where the power is smaller, the output from the power correction circuit 72 becomes larger and then the threshold-multiplying coefficient Pf_th (t) becomes larger.

The threshold switching circuit 76 outputs the threshold-multiplying coefficient Pf_th (t) calculated as described in the above paragraph to the threshold comparing circuit 78.

Consequently, in the case where the output from the power correction circuit 72 is smaller, the relative threshold becomes smaller, and in the case where the output from the power correction circuit 72 is larger, the relative threshold becomes larger. In other words, according to the second embodiment, in the case where the output from the power correction circuit 72 is smaller, since the ratio of the unnecessary power such as noise, etc. is smaller, the precision of the propagation-path estimation is improved by heightening the relative threshold, and in the case where the output from the power correction circuit 72 is larger, since the ratio of the unnecessary power is larger, the complex gains generated by noise thereof is eliminated by lowering the relative threshold.

In addition, according to the second embodiment, it is configured that three kinds of the threshold calculation coefficients is settable, however, it is possible to configure that other threshold calculation coefficients than the three kinds of the threshold calculation coefficients are settable.

The comparing results of the threshold comparing circuit 78 are processed by the adding circuit 44 and the fast Fourier transform circuit 46 as in the first embodiment, and the comparing results are provided to the equalizing calculation unit 68.

The equalizing calculation unit 68 according to the second embodiment includes the correction vector calculation circuit 60 and the two multiplying circuits 62, 64. The correction vector calculation circuits 60, 62 operates as described in the first embodiment. The arithmetic adding circuit 64 newly-added in the second embodiment is provided with the outputs from the correction vector calculation circuit 60 (indicates the correction value) and the outputs from the power correction circuit 72 after being delayed by the one-symbol delay circuit 22 (indicates the gain). The multiplying circuit 64 generates an amplitude information correspond to input variations at the input terminal of the amplifier 74 by multiplying the inputted correction value and the inputted gain. The amplitude information can be used as reliability information (information indicating the transmission reliability corresponding to the propagation-path state) necessary in the case where the OFDM signals are demodulated while the transmission errors thereof being corrected after the OFDM signals are equalized by the equalizer 70.

As explained before, since the amplifier 74 for amplifying the OFDM signal by the gain corresponding to the power detected is installed at the precedent stage of the fast Fourier transform circuit 12 for fast-Fourier transformation of the OFDM signal, it is possible that the dynamic range of the input signals to the fast Fourier transform circuit 12 and the channel estimation unit 66 can be narrowed, and then the dynamic range of the fast Fourier transform circuit 12 and the channel estimation unit 66 can be narrowed. Consequently, the calculation-bit-widths of the circuits composing the fast Fourier transform circuit 12 and the channel estimation unit 66 can be narrowed, and the circuit amounts of the fast Fourier transform circuit 12 and the channel estimation unit 66 can be reduced.

Since it is configured that the amplitude information correspond to input variations at the input terminal of the amplifier 74 is generated by multiplying the output from the correction vector calculation circuits 60 (correction value) and the output from the power correction circuit 72 (gain), the amplitude information can be used as reliability information necessary in the case where the OFDM signals are demodulated while the transmission errors thereof being corrected after the OFDM signals are equalized, and then demodulation having a high error correction capability can be realized.

Figure 12:
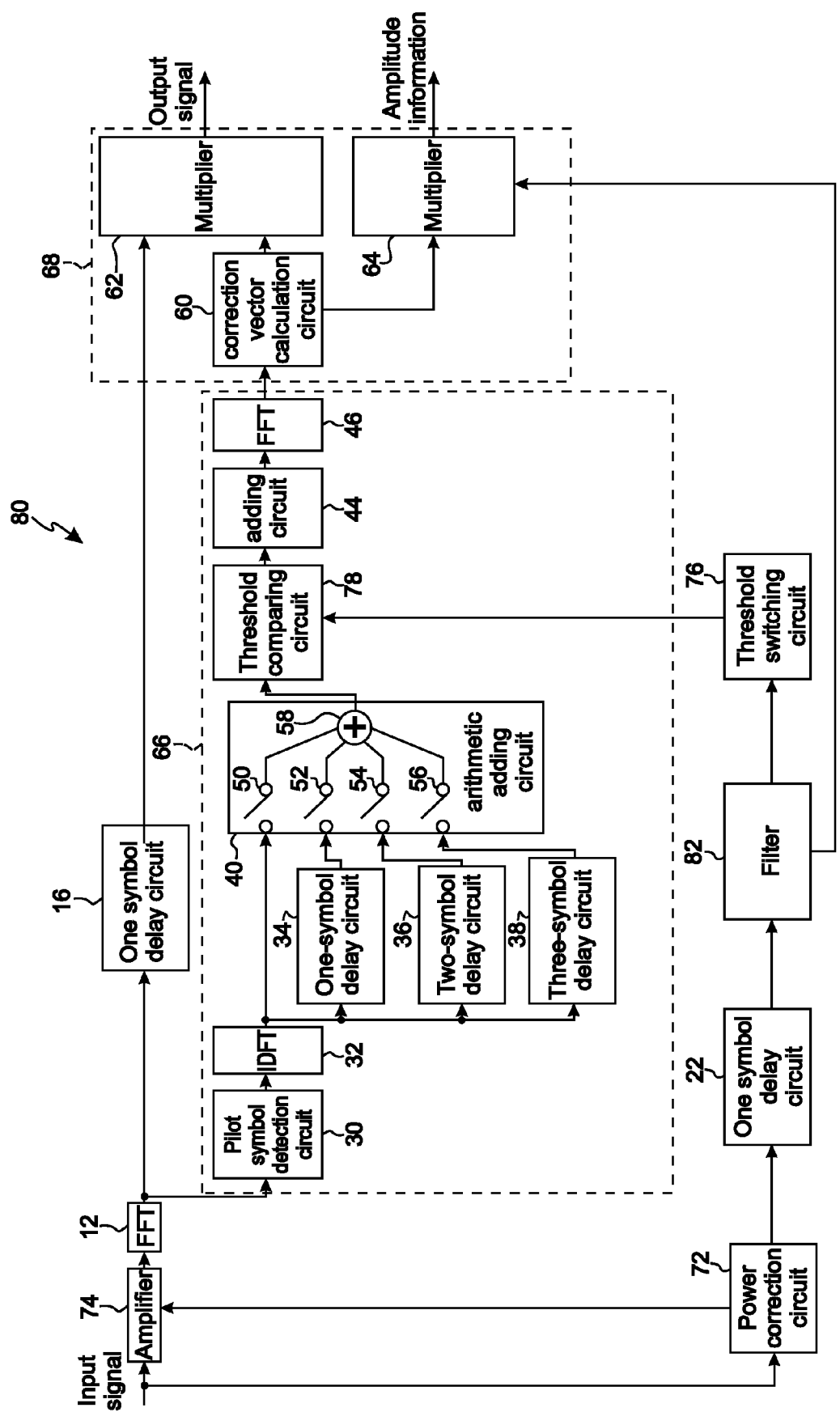
FIG. 12 is a block diagram of an equalizer according to another embodiment of the present invention.
Figure 13:
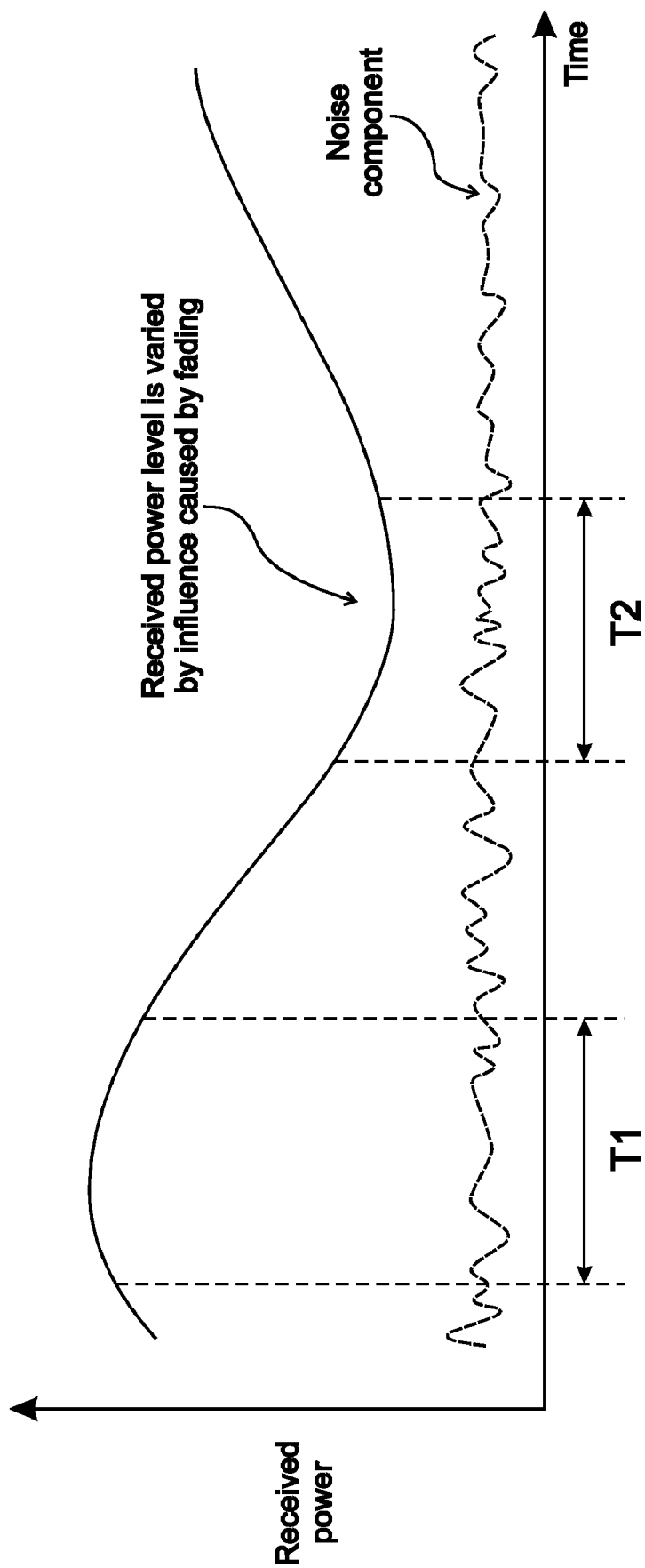
FIG. 13 is an explanatory diagram of variations in the received power level caused by various influences.

FIG. 12 is a block diagram of an equalizer 80 according to the third embodiment. In the equalizer 80 according to the third embodiment, the same elements identical to the ones in the equalizer 10 of the first embodiment and the equalizer 70 of the second embodiment are given the same numerals, and the explanations thereof will be omitted. As shown in FIG. 12, in the equalizer 80 according to the third embodiment, a filter 82 is installed between the one-symbol delay circuit 22, which is placed at the subsequent stage of the power correction circuit 72, and the threshold switching circuit 76.

The filter 82 extracts and outputs specified components form the output signal (indicates the gain) from the power correction circuit 72 after being one-symbol delayed by the one-symbol delay circuit 22. On condition that the filter 82 is usable in the case where the relative threshold is calculated, the kinds thereof are not limited. In a case where LPF (low pass filter) or limiter (extended filter) is used as the filter 82, the relative threshold can be modestly changed without responding to rapid variations of the received power such as shadowing, etc. or instantaneous pulse noises. Consequently, the threshold comparing using appropriate thresholds can appropriately extract the path. In addition, a HPF filter (high pass filter), etc. can be used as the filter 82. The necessary dynamic range for receiving the OFDM signal is narrower than the fluctuation band of the received power. Therefore, even in the case where modest OFDM signals having large amplitudes can be received, since variations in the powers or amplitudes are reduced by installing the filter such as HPF, etc., the most appropriate relative threshold can be obtained even for the variations having a short period such as fading, etc. Subsequently, the threshold switching circuit 76 or the threshold comparing circuit 78 does not need to have large dynamic ranges Also, in the above-mentioned first embodiment, it is possible to configure that installing the filter at the subsequent stage of the power detection circuit 20 can reduce the variations in the power.

In addition, the circuit for generating the amplitude information by multiplying the output from the correction vector calculating circuit 60 and the output from the power detection circuit 20 can be included in the equalizer 10 of the first embodiment.

It is possible to configure that the threshold comparing circuit 42 of the first embodiment conducts the threshold comparing using the sum of the absolute values of the real and the imaginary parts of the complex gains as in the threshold comparing circuit 78 of the second and the third embodiments, on the contrary, it is possible configure that the threshold comparing circuit 78 of the second and the third embodiments conducts the threshold comparing using the power value obtained by calculating the second power of the complex gain as in the threshold comparing circuit 42 of the first embodiment.

What is claimed is:

1. An equalizer circuit, comprising:
a first Fourier transform circuit which Fourier-transforms an input signal and outputs a corresponding first Fourier-transformed signal;
a first extracting circuit which extracts a plurality of pilot symbols from the first Fourier-transformed signal;
an inverse Fourier transform circuit which calculates a complex gain of each path of the input signal by inverse-transforming the plurality of pilot symbols extracted by the first extracting circuit;
a detecting circuit which detects at least one of a power value and a mean amplitude of the input signal;
a coefficient determining circuit which determines a coefficient corresponding to the at least one of the power value and the mean amplitude detected by the detecting circuit;
a second extracting circuit which extracts complex gains having a power larger than a threshold obtained by multiplying the coefficient determined by the coefficient determining circuit by a value obtained by integrating the power for a period of time, wherein the power is obtained from the complex gains of each path of the input signal calculated by the inverse Fourier transform circuit;
a second Fourier transform circuit which Fourier-transforms the extracted complex gains from the second extracting circuit to obtain a corresponding second Fourier-transformed signal; and
an equalizing calculation circuit which equalizes the input signal using the second Fourier-transformed signal.

2. The equalizer of claim 1, wherein a magnitude of the at least one of the power and the mean amplitude of the input signal is inversely related to a size of the coefficient determined by the coefficient determining circuit.

3. The equalizer of claim 1, wherein the detecting circuit outputs an inverse number of ratio of the at least one of the power and the mean amplitude of the input signal to a reference power or a reference mean amplitude detected results and includes an amplifier for amplifying the input signal by a gain of the inverse number calculated by the detecting circuit before the Fourier transform by the first Fourier transform circuit.

4. The equalizer of claim 3, wherein the coefficient is proportional to the inverse number.

5. The equalizer of claim 1, wherein a filter is included on the output side of the detecting circuit to reduce influences caused by variations in the power or the amplitude of the input signal.

6. The equalizer of claim 1, further comprising a generation circuit for generating reliability information used for correcting transmission errors during demodulation of the input signal after equalized by multiplying the transformed result of the second transforming circuit and the detected result of the detecting circuit by the equalizing circuit.

7. An equalizer comprising:
a first Fourier transform circuit which Fourier-transforms an input signal and outputs a corresponding first Fourier-transformed signal;
a first extracting circuit which extracts a plurality of pilot symbols from the first Fourier-transformed signal;
an inverse Fourier transform circuit which calculates a complex gain of each path of the input signal by inverse-transforming the plurality of pilot symbols extracted by the first extracting circuit;
a detecting circuit which detects at least one of a power value and a mean amplitude of the input signal;
a coefficient determining circuit which determines a coefficient corresponding to the at least one of the power value and the mean amplitude detected by the detecting circuit;
a second extracting circuit which extracts complex gains having a sum of absolute values of real parts and imaginary parts of complex gains, larger than a threshold obtained by multiplying a value by the coefficient, wherein the value is calculated by integrating the sum of the absolute value of the real part and the absolute value of the imaginary part of the complex gain calculated by the inverse Fourier transform circuit with respect of each path of the input signal for a period of time;
a second Fourier transform circuit for Fourier-transforming the extracted complex gains from the second extracting circuit to obtain a corresponding second Fourier-transformed signal; and
an equalizing calculation circuit for equalizing the input signal using the second Fourier-transformed signal.

8. The equalizer of claim 7, wherein a magnitude of the at least one of the power and the mean amplitude of the input signal is inversely related to a size of the coefficient determined by the coefficient determining circuit.

9. The equalizer of claim 7, wherein the detecting circuit outputs an inverse number of ratio of the at least one of the power and the mean amplitude of the input signal to a reference power or a reference mean amplitude detected results and includes an amplifier for amplifying the input signal by a gain of the inverse number calculated by the detecting circuit before the Fourier transform by the first Fourier transform circuit.

10. The equalizer of claim 9, wherein the coefficient is proportional to the inverse number.

11. The equalizer of claim 7, wherein a filter is included on the output side of the detecting circuit to reduce influences caused by variations in the power or the amplitude of the input signal.

12. The equalizer of claim 7, further comprising a generation circuit for generating reliability information used for correcting transmission errors during demodulation of the input signal after equalized by multiplying the transformed result of the second transforming circuit and the detected result of the detecting circuit by the equalizing circuit.

* * * * *